(12) United States Patent
Jha et al.

(10) Patent No.: US 11,524,794 B2
(45) Date of Patent: Dec. 13, 2022

(54) ILLUMINATED AIRCRAFT PASSENGER CABIN GASPER

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE); Jens Leuschner, Moehnesee (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 102 days.

(21) Appl. No.: 16/950,150

(22) Filed: Nov. 17, 2020

(65) Prior Publication Data
US 2021/0155351 A1  May 27, 2021

(30) Foreign Application Priority Data

Nov. 21, 2019  (EP) .................... 19210626

(51) Int. Cl.
| | | |
|---|---|---|
| B64D 47/02 | (2006.01) | |
| B60H 1/34 | (2006.01) | |
| F21V 33/00 | (2006.01) | |
| F24F 13/078 | (2006.01) | |
| B64D 11/00 | (2006.01) | |
| B64D 13/00 | (2006.01) | |

(52) U.S. Cl.
CPC ........... *B64D 47/02* (2013.01); *B60H 1/3435* (2013.01); *F21V 33/0092* (2013.01); *F24F 13/078* (2013.01); *B64D 2011/0053* (2013.01); *B64D 2013/003* (2013.01); *B64D 2231/025* (2013.01)

(58) Field of Classification Search
CPC ... B64D 2013/003; B64D 47/02; F21V 11/04; F24F 13/078
See application file for complete search history.

(56) References Cited

U.S. PATENT DOCUMENTS 4,916,591 A * 4/1990 Schiele ................ B60H 1/3414
362/489
6,437,704 B1 * 8/2002 Nodinger ................ B60Q 3/20
454/126
(Continued)

FOREIGN PATENT DOCUMENTS

DE  202009005100 U1  11/2009
DE  102014018302 A1  6/2016
(Continued)

OTHER PUBLICATIONS

Abstract of DE 102014018302A1.
(Continued)

*Primary Examiner* — Alexander K Garlen
(74) *Attorney, Agent, or Firm* — Cantor Colburn LLP

(57) ABSTRACT

An illuminated aircraft passenger cabin gasper comprises an air outlet for outputting a flow of air into an aircraft passenger cabin and an air guide, movably arranged within the air outlet for adjusting the flow of air that includes a light guide. The gasper also includes at least one light source, arranged adjacent to the light guide for coupling light into the light guide. The light guide has a light output surface for coupling light out of the light guide into the aircraft passenger cabin.

14 Claims, 11 Drawing Sheets

(56) References Cited

U.S. PATENT DOCUMENTS

| | | | |
|---|---|---|---|
| 7,014,557 B2* | 3/2006 | Thomassin | B60H 1/3442 |
| | | | 454/324 |
| 7,527,402 B2 | 5/2009 | Scown et al. | |
| 7,627,402 B2 | 5/2009 | Scown et al. | |
| 8,100,547 B2 | 1/2012 | Hogh et al. | |
| 8,858,047 B2 | 10/2014 | Rittner et al. | |
| 9,045,235 B2 | 6/2015 | Rittner et al. | |
| 9,365,291 B2 | 6/2016 | Savian | |
| 10,372,231 B2 | 8/2019 | Schalla et al. | |
| 10,752,082 B1* | 8/2020 | Kearney | B60H 1/0025 |
| 2006/0116063 A1* | 6/2006 | Seume | B64D 13/00 |
| | | | 454/76 |
| 2010/0093267 A1* | 4/2010 | Hogh | F21V 33/0092 |
| | | | 362/543 |
| 2012/0083195 A1 | 4/2012 | Gruedl | |
| 2017/0137129 A1* | 5/2017 | Hessling-Von Heimendahl | |
| | | | B64D 47/02 |
| 2017/0190241 A1* | 7/2017 | Chung | B60H 1/3407 |
| 2018/0056758 A1* | 3/2018 | Salter | A61L 9/205 |
| 2020/0207183 A1* | 7/2020 | Grant | B64D 13/00 |
| 2020/0207263 A1* | 7/2020 | Kim | B60H 1/3421 |

FOREIGN PATENT DOCUMENTS

| | | |
|---|---|---|
| DE | 102016003974 A1 | 9/2016 |
| EP | 3103664 A1 | 12/2016 |
| WO | 2017182392 A1 | 10/2017 |

OTHER PUBLICATIONS

Abstract of DE 102016003974A1.
Abstract of EP3103664A1.
Extended European Search Report for International Application No. 19210626.8 dated May 26, 2020, 7 pages.

* cited by examiner

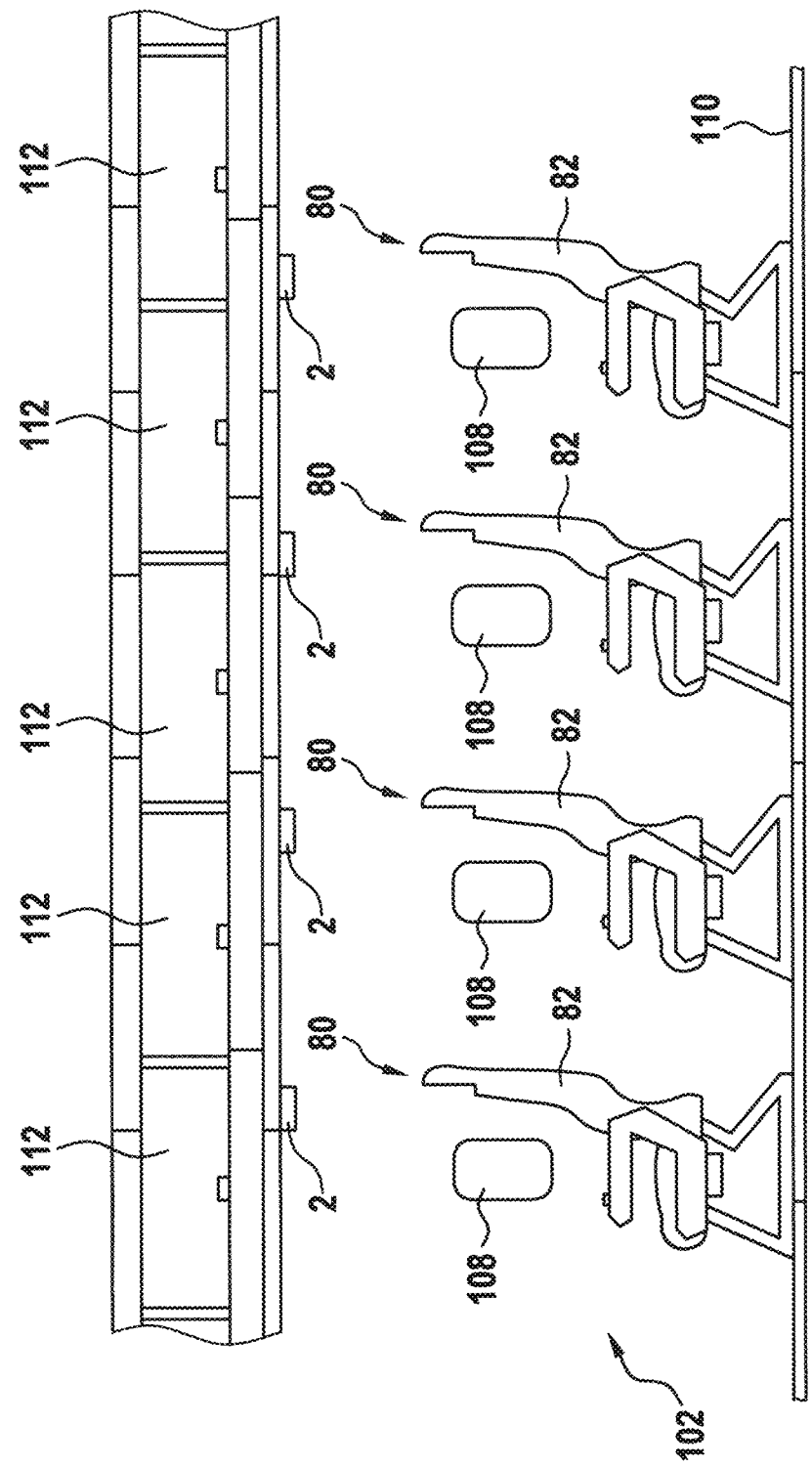

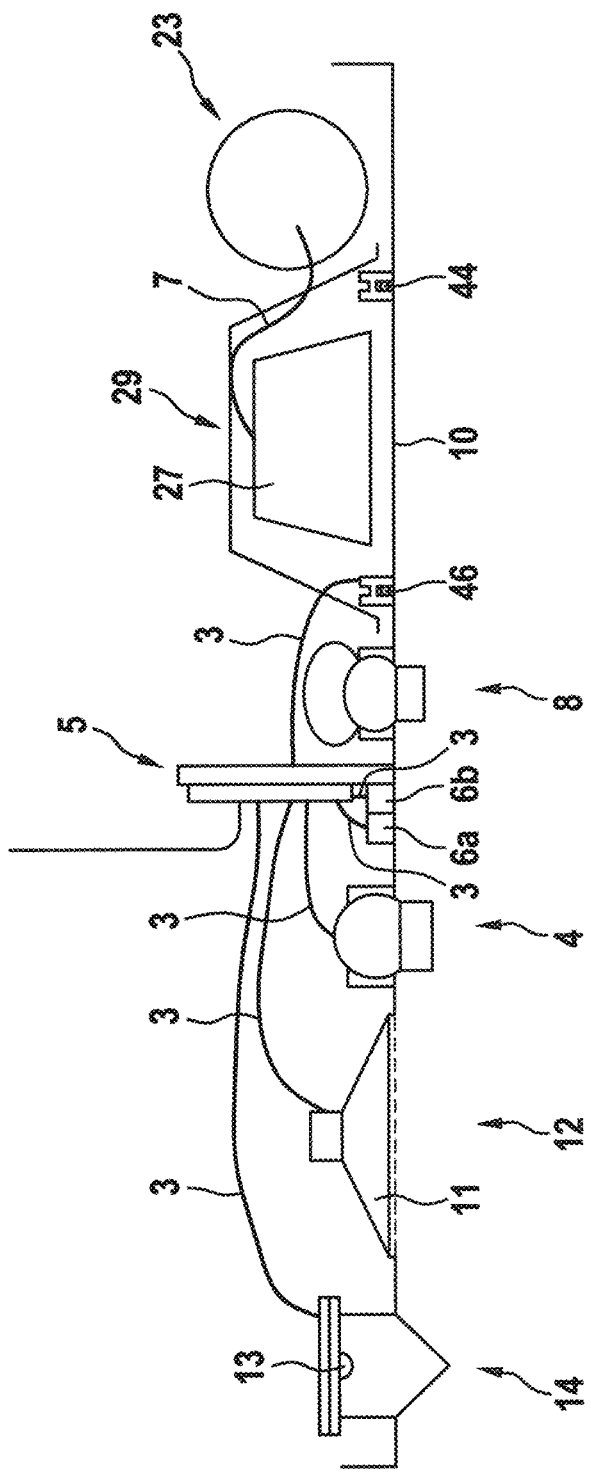

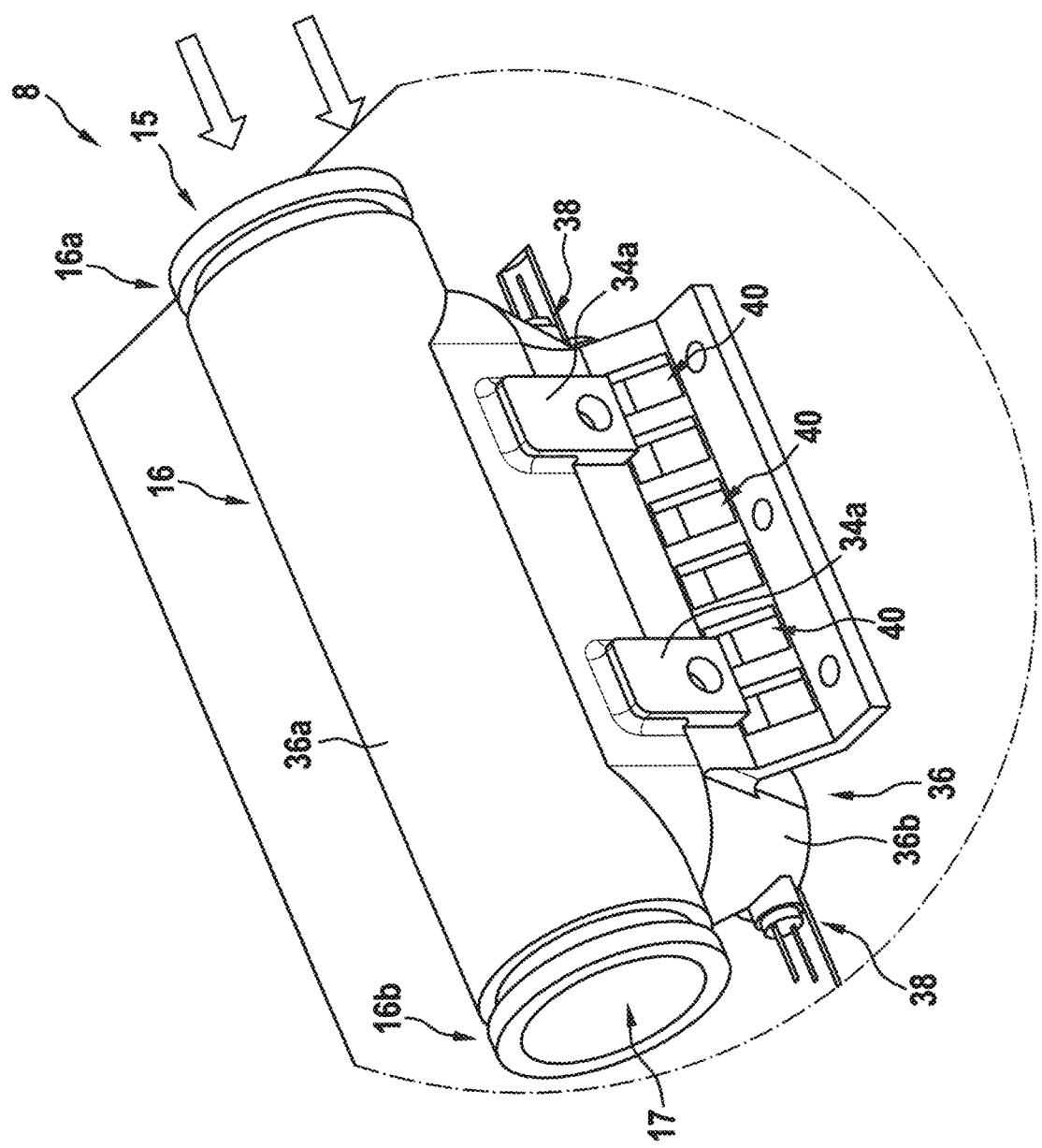

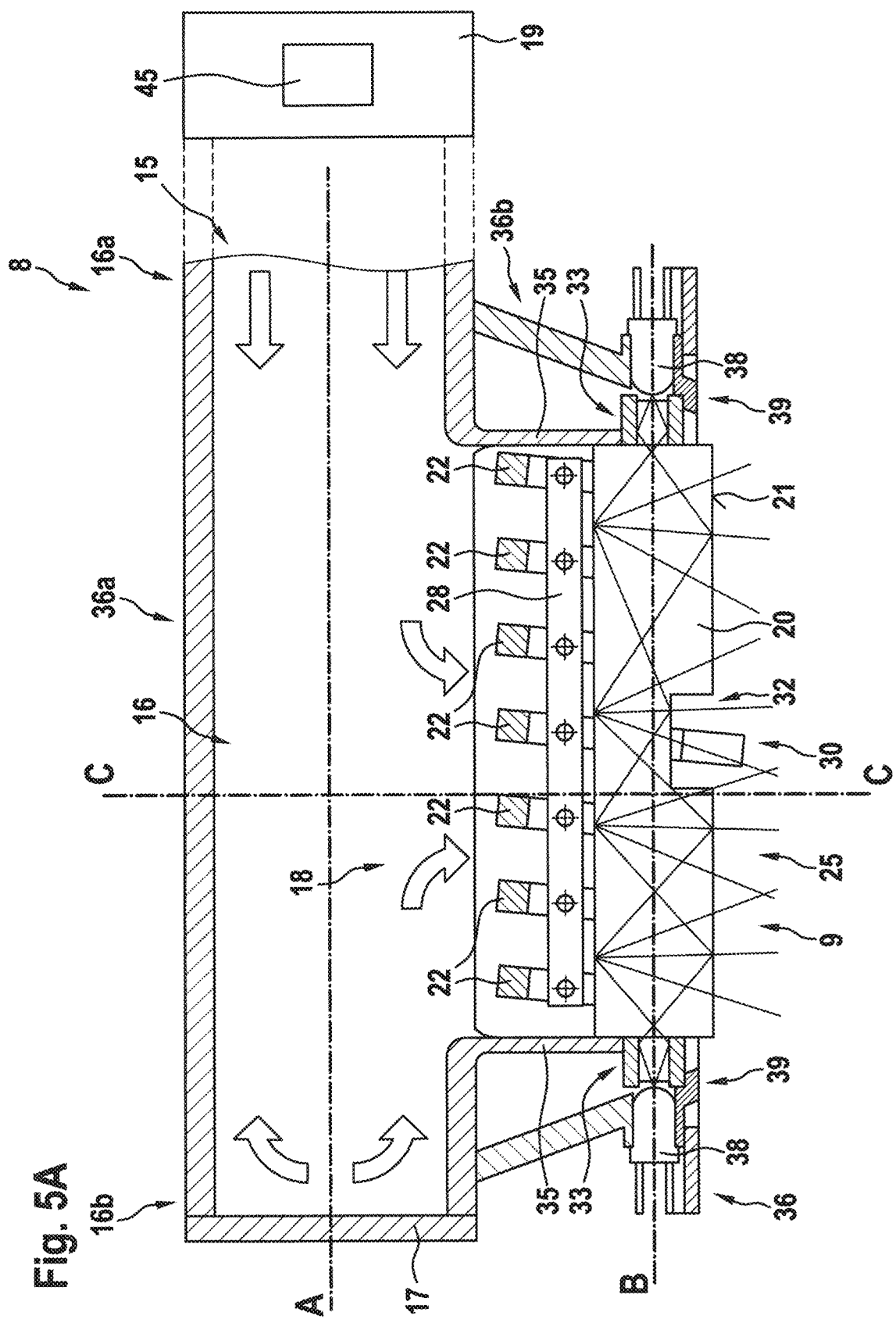

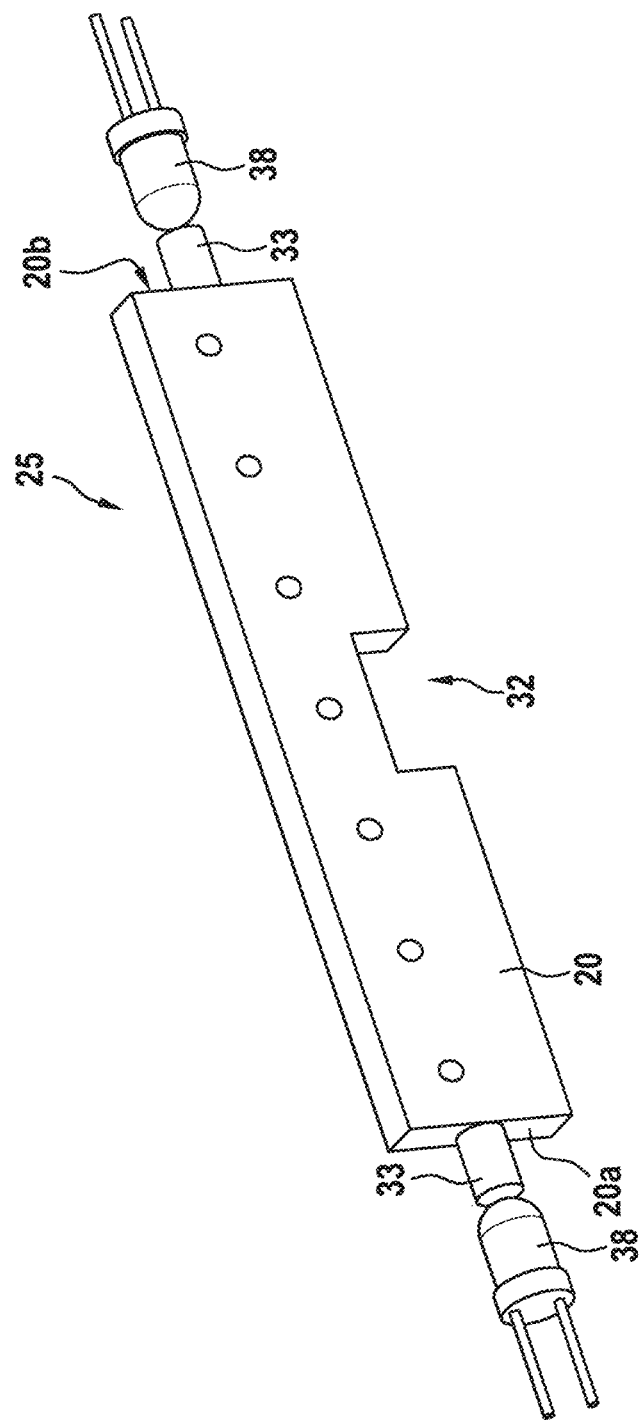

ILLUMINATED AIRCRAFT PASSENGER CABIN GASPER

FOREIGN PRIORITY

This application claims priority to European Patent Application No. 19210626.8 filed Nov. 21, 2019, the entire contents of which is incorporated herein by reference.

TECHNICAL FIELD

The present invention is in the field of aircraft passenger cabin gaspers. The present invention is in particular related to illuminated aircraft passenger cabin gaspers.

BACKGROUND

Passenger aircraft, such as commercial air planes, usually have a passenger cabin with a plurality of passenger seats and aircraft passenger cabin gaspers, arranged above the passenger seats for supplying air towards passengers sitting on the passenger seats. The aircraft passenger cabin gaspers are typically adjustable, in order to allow modifying the direction and/or the amount of air delivered towards the passengers.

In a dark environment, for example when the light within the passenger cabin is dimmed low or switched off, passengers may have difficulties in finding the corresponding gasper(s) for adjusting the flow of air, delivered by the gasper(s), according to their current desire.

Therefore, it would be beneficial to provide an improved aircraft passenger cabin gasper, which may be identified more easily in a dark environment.

SUMMARY

According to an exemplary embodiment of the invention, an illuminated aircraft passenger cabin gasper, which is also simply referred to as "gasper" in the following, comprises an air outlet for outputting a flow of air into an aircraft passenger cabin, and at least one air guide, which is movably arranged within the air outlet for adjusting the flow of air flowing through the air outlet. The at least one air guide comprises at least one light guide, and the gasper further comprises at least one light source arranged adjacent to the at least one light guide for coupling, in operation, light into the at least one light guide. The at least one light guide has a light output surface for coupling light out of the at least one light guide into the aircraft passenger cabin.

With this structure, operating the at least one light source may allow for light propagation within the at least one light guide and an output of light towards the passenger via the light output surface. Light from the light guide may thus allow passengers to easily identify and locate the gasper, even in a dark environment. In consequence, even in a dark environment, passengers have no difficulties in adjusting the flow of air flowing out of the gaspers.

Additionally or alternatively, the light emitted via the light output surface of the at least one light guide of the gasper may be used as an indicator signal, e.g. for indicating that a service call button was pressed by a passenger.

In an embodiment, the light guide comprises transparent material or translucent material, forming an extended body that allows light to pass through/propagate therein. The light guide may in particular be completely made of a transparent or translucent material. Alternatively, the light guide may comprise a combination of transparent/translucent material and opaque material. A light guide made completely of a transparent or translucent material allows for maximum light transmission. A light guide comprising a combination of transparent/translucent material and opaque material allows for shaping the light output according to the respective needs by selectively arranging the transparent/translucent and opaque materials within the light guide.

The extended body may be at least partially surrounded by border surfaces, a painting and/or a coating, configured for reflecting the light propagating through the at least one light guide, in order to prevent the light from undesirably coupling out of the at least one light guide. Preventing light from undesirably coupling out of the at least one light guide enhances the optical efficiency of the at least one light guide, it in particular increases the intensity of the light emitted via the dedicated light output surface and avoids or at least reduces the generation of undesirable stray light.

In an embodiment, surface irregularities are formed on or within at least one surface of the at least one light guide, in order to allow light, propagating through the at least one light guide, to be coupled out of the at least one light guide into the passenger cabin. The surface irregularities may in particular be formed for causing a sufficient amount of light to be output via the dedicated light output surface, preventing the light, propagating through the at least one light guide, from being (totally) reflected at the surfaces of the at least one light guide.

In an embodiment, the light output surface is an extended surface and light is output through various portions/areas of the extended surface.

In an embodiment, the at least one light guide comprises at least one light entry surface facing the at least one light source for receiving light from the at least one light source and coupling said light into the at least one light guide. In an embodiment, the at least one light entry surface is arranged transversely, in particular basically orthogonally, to the light output surface. Such a configuration allows for a convenient and space-saving arrangement of the at least one light source within the gasper.

In an embodiment, the gasper comprises a housing with a support portion supporting the at least one air guide, in particular pivotably supporting the at least one air guide.

In an embodiment, the at least one light guide has a generally cuboid structure. A light guide having a generally cuboid structure is easy to produce and allows for a convenient structure of the housing pivotably supporting the at least one light guide.

In an embodiment, the housing comprises an air inlet for receiving air to be output via the air outlet. The air inlet may be in fluid communication with an air duct for receiving the air via the air duct, e.g. from a central air supply of the aircraft.

In an embodiment, the air inlet is in fluid communication with a fan, which is configured for delivering air from the direct environment of the gasper into the air inlet. The fan may be part of the gasper or part of an aircraft passenger cabin service unit (PSU), comprising at least the gasper and the fan.

In an embodiment, the housing comprises an upper portion and a lower portion. The air outlet with the at least one air guide may be located in the lower portion, and the air inlet may be provided in the upper portion of the housing.

In an embodiment, the upper portion of the housing is fixed to the lower portion of the housing by means of a snap-on mechanism, comprising elastic latches formed at the upper portion and configured for engaging corresponding protrusions formed at the lower portion of the housing.

In another embodiment, the latches may be formed at the lower portion, and the protrusions may be formed at the upper portion.

In an embodiment, adjusting the flow of air by moving the at least one air guide includes changing the direction and/or changing the volume of the flow of air flowing out of the air outlet.

In an embodiment, the at least one light guide is a portion of or attached to the at least one air guide. Such a configuration allows shaping the at least one light guide and the at least one air guide individually in order to be optimized with respect to their respective functions.

In an embodiment, the at least one air guide is basically identical with the at least one light guide. Each light guide may simultaneously function as an air guide. A single guide element, simultaneously providing the functions of an air guide and of a light guide, allows for a little complex configuration, which may be produced at low costs.

In an embodiment, the gasper comprises at least two light sources. The at least two light sources may be arranged on opposite sides of the at least one light guide for coupling light into the at least one light guide. The at least two light sources may emit light of the same color or light having different colors.

Each of the light sources may be a single-color light source, which is capable of emitting only light of a single predefined color/a single predefined color spectrum. Alternatively, at least one of the light sources may be a multi-color light source, e.g. a multi-color LED, which is controllable to selectively emit light having a color which is selected from a plurality of different colors.

Providing light sources which emit light of the same color allows for a very homogeneous illumination of the at least one light guide. Providing two or more light sources which are capable of emitting light having different colors allows for changing the color of the light, emitted from the at least one light guide, by selectively controlling/switching the at least two light sources. With such a configuration, the color of the light emitted from the at least one light guide may be changed according to the passengers' preferences or for providing a signal displaying information. Emitting light of a predefined color may for example indicate that a service call button was pressed by a passenger.

In an embodiment, the at least one air guide is pivotable around a longitudinal axis, i.e. around an axis extending in the longitudinal direction, in order to allow adjusting the direction of the flow of air flowing out of the gasper via the air outlet.

In an embodiment, the at least one light source is arranged basically on said longitudinal axis and/or is arranged in such a way that a main light emission direction of the at least one light source substantially corresponds with said longitudinal axis. As a result, the position of the at least one light source with respect to the at least one air guide does not change when the at least one air guide is pivoted around the longitudinal axis.

In an embodiment, the at least one air guide comprises at least one longitudinal air guide element, extending in the longitudinal direction, and at least one transverse air guide element, extending transversely to the longitudinal direction. The at least one transverse air guide element may in particular be mounted to the longitudinal air guide element in a configuration which allows the at least one transverse air guide element to pivot with respect to the longitudinal air guide element. Providing at least one longitudinal air guide element and at least one additional transverse air guide element, which is pivotable with respect to the at least one longitudinal air guide element, allows adjusting the direction of the flow of air in two dimensions, namely in the longitudinal direction and in a lateral direction, which is oriented transversely, in particular orthogonally, to the longitudinal direction. The light guide may be the longitudinal air guide element or may be part of the longitudinal air guide element.

In an embodiment, each transverse air guide element is pivotable around a corresponding transverse axis, which is oriented orthogonally to the longitudinal direction.

In an embodiment, the plurality of transverse air guide elements are pivotably connected to a common link extending in the longitudinal direction. The common link is movable, in particular shiftable, in the longitudinal direction by pivoting at least one of the plurality of transverse air guide elements. A motion of the common link in the longitudinal direction corresponds to a pivoting motion of the plurality of transverse air guide elements. The plurality of transverse air guide elements are mechanically coupled with each other by the common link, so that pivoting one of the plurality of transverse air guide elements may cause all transverse air guide elements to pivot simultaneously.

In an embodiment, the gasper comprises a plurality of air guides arranged parallel to each other, so that the longitudinal and transverse air guide elements of the plurality of air guides may form an air outlet grid. An air outlet grid may be a very efficient way to adjust the flow of air, flowing out of the air outlet of the gasper.

In an embodiment, the gasper comprises at least one additional air channel, which in the following is called satellite air channel. The at least one satellite air channel is formed next to the air outlet, so that air flowing through the air outlet causes additional air to be sucked, due to the Venturi effect, through the at least one satellite air channel and to be output together with, in particular basically parallel with, the flow of air, flowing through the air outlet. Providing at least one satellite air channel efficiently enhances the flow of air delivered towards the passenger.

Exemplary embodiments of the invention further include an aircraft passenger cabin service unit, comprising at least one gasper according to any of the exemplary embodiments of the invention, as described herein. The aircraft passenger cabin service unit may further comprise at least one additional component of the group including a reading light, an oxygen mask, a loudspeaker, a display panel comprising at least one visual sign, such as a "no smoking" sign and/or a "fasten your seat belt" sign, and an electrical switch. The aircraft passenger cabin service unit may also comprise any combination of components including at least two of these components. The aircraft passenger cabin service unit may also comprise multiple instances of any of the listed additional components.

In an embodiment, the aircraft passenger cabin service unit comprises at least two aircraft passenger cabin gaspers according to any of the exemplary embodiments of the invention, as described herein. In such an embodiment, the light sources of the different gaspers may be configured for emitting light of the same color. Alternatively, the light sources of the different gaspers may be configured for emitting light of different colors. In a configuration in which the light sources of the different gaspers are configured for emitting light of different colors, the gaspers may be distinguished from each other by the different colors of the emitted light. The different colors, for example, may be used for indicating the relation between the gasper and a corresponding passenger seat, e.g. by providing a marker of the same color at the corresponding passenger seat.

Exemplary embodiments of the invention further include an aircraft, in particular a passenger air plane, comprising a passenger cabin with a plurality of aircraft passenger cabin gaspers according to any of the exemplary embodiments of the invention, as described herein.

Exemplary embodiments of the invention also include an aircraft, in particular a passenger air plane, comprising a passenger cabin with a plurality of aircraft passenger cabin service units according to exemplary embodiments of the invention.

BRIEF DESCRIPTION OF THE DRAWINGS

Further exemplary embodiments of the invention will be described with respect to the accompanying drawings, wherein:

FIG. 2 depicts a longitudinal cross-sectional view of a portion of the passenger cabin of the aircraft shown in FIG. 1.

FIG. 3B depicts a schematic cross-sectional view through the aircraft passenger cabin service unit shown in FIG. 3A.

FIG. 4A depicts a perspective view of a gasper according to an exemplary embodiment of the invention.

FIG. 5A depicts a longitudinal cross-sectional view through the gasper depicted in FIGS. 4A to 4C.

FIG. 7 depicts a perspective view of a longitudinal air guide element without the transverse air guide elements.

DETAILED DESCRIPTION

Figure 1:
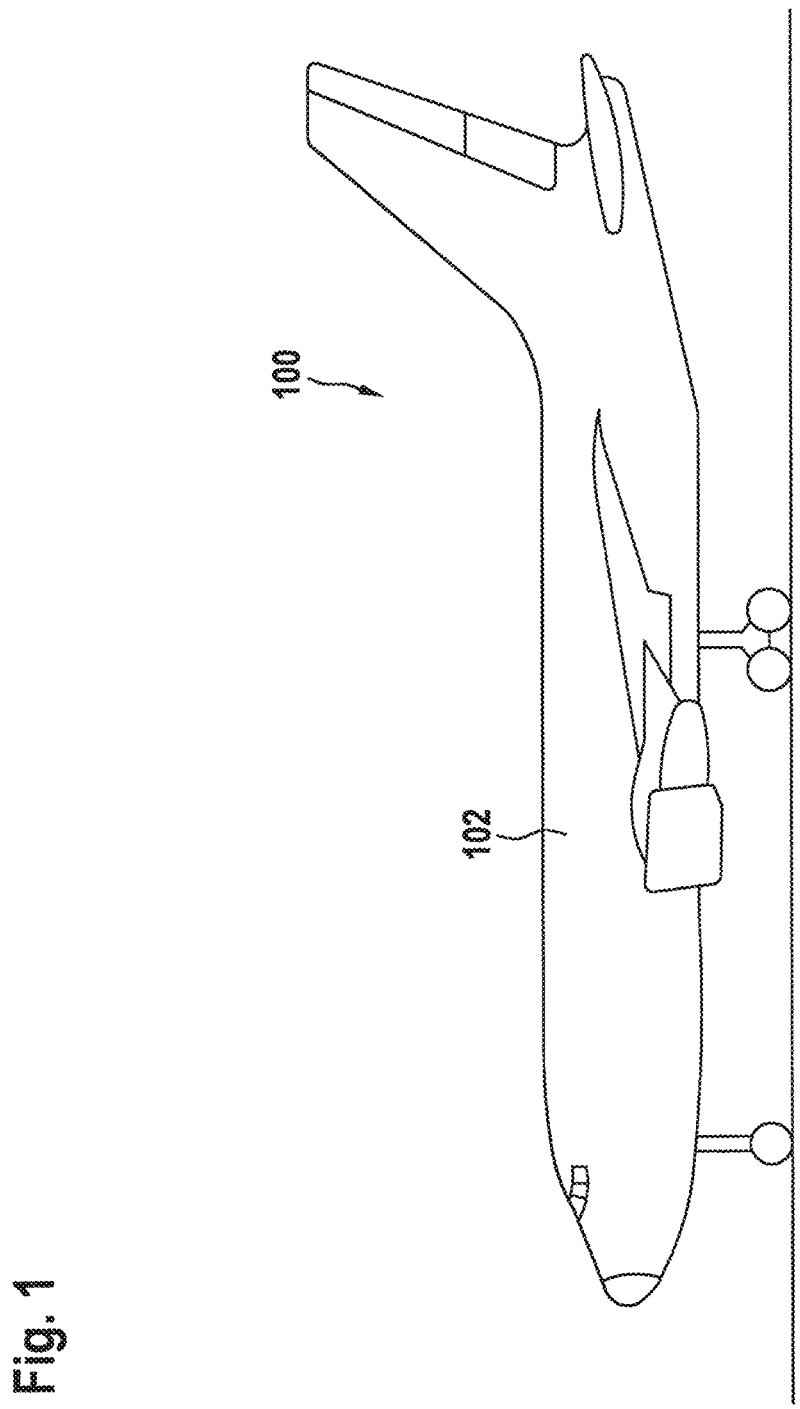
FIG. 1 depicts a schematic side view of an aircraft in accordance with an exemplary embodiment of the invention having a passenger cabin.

FIG. 1 shows a schematic side view of an aircraft 100, in particular an air plane 100, with a passenger cabin 102. FIG. 2 shows a longitudinal cross-sectional view of a portion of the passenger cabin 102 of the aircraft 100, depicted in FIG. 1.

Four passenger seats 82 are depicted in FIG. 2. The passenger seats 82 are mounted to a floor 110 of the passenger cabin 102. Each of the depicted passenger seats 82 belongs to a different seating row 80. Each seating row 80 includes a plurality of, for example three, passenger seats 82. The additional (second and third) passenger seats 82 of each seating row 80 are not visible in FIG. 2, as they are arranged behind and therefore hidden by the depicted first passenger seats 82, respectively.

For each of the seating rows 80, a window 108 is provided, which allows the passengers to view the outside of the aircraft 100. Further, a plurality of overhead baggage compartments 112 are shown, which provide storage space for baggage.

An aircraft passenger cabin service unit ("PSU") 2 is arranged above each of the seating rows 80, respectively.

Figure 3A:
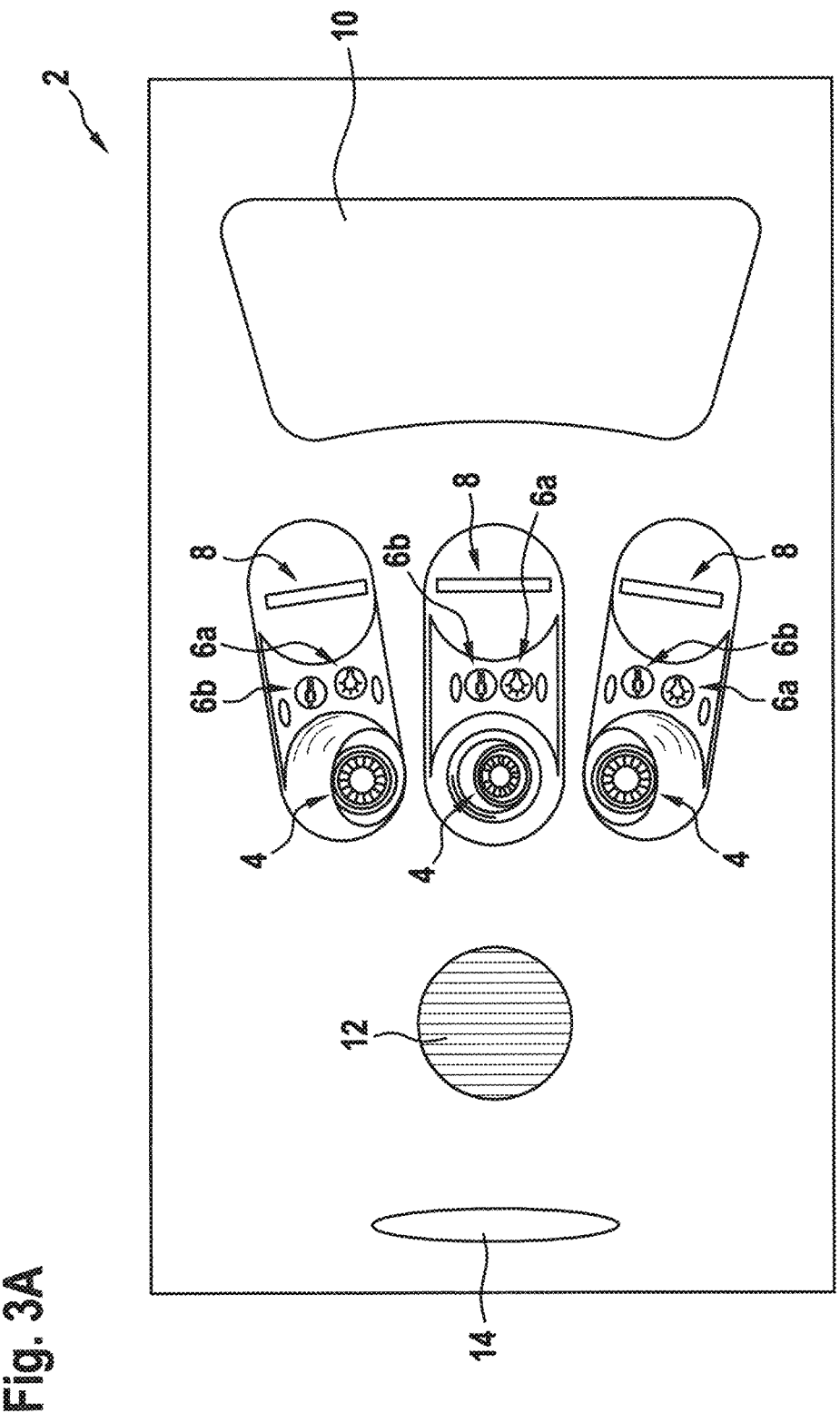
FIG. 3A depicts an aircraft passenger cabin service unit, as it is seen from a passenger sitting on one of the passenger seats.

FIG. 3A depicts a schematic view of PSU 2, as it is seen from a passenger (not shown) sitting on one of the passenger seats 82 below the PSU 2. FIG. 3B depicts a schematic cross-sectional view of the PSU 2.

The PSU 2 comprises at least one oxygen reservoir 23, e.g. an oxygen candle, which is shown on the right side of FIG. 3B, and which is not visible in FIG. 3A. The oxygen reservoir 23 is in fluid communication with at least one oxygen mask 27 by means of a flexible hose 7 for delivering oxygen to the oxygen mask 27, in case of a loss of air pressure within the cabin.

The oxygen mask 27 is arranged in a cavity 29 covered by a cover 10. Although only one oxygen mask 27 is visible in the cross-sectional view depicted in FIG. 3B, the PSU 2 comprises a plurality of oxygen masks 27 arranged in one or more cavities 29. In the event of pressure loss within the passenger cabin 102, the cover 10 will open, the oxygen masks 27 will drop out of the cavity 29, and each of the passengers sitting below the PSU 2 may grasp one of the oxygen masks 27. The oxygen masks 27 will be supplied with oxygen from the oxygen reservoir 23, allowing the passengers to continue breathing normally.

The cover 10 is pivotable around a horizontally extending axle 44, arranged at a first side of the cover 10. A switchable locking mechanism 46, preventing the cover 10 to pivot around the axle 44 in its locked state, is provided at a second side of the cover 10, which is opposite to the axle 44. In the event of pressure loss within the cabin, the locking mechanism 46 will open, allowing the cover 10 to pivot around the axle 44, providing access to the cavity 29, and releasing the oxygen mask(s) 27 stored within the cavity 29.

A row of three adjacent aircraft passenger cabin gaspers 8, in the following called "gaspers" 8, are provided next to the cavity 29. The gaspers 8 are configured for blowing air towards the passengers, sitting on the passenger seats 82 below the PSU 2. The gaspers 8 have rectangular or nearly rectangular cross-sections. The gaspers 8 in particular have a longitudinal air outlet for delivering air towards the passengers. Details of the gaspers 8 will be discussed below with reference to FIGS. 4 to 7.

Six electrical switches 6a, 6b are provided next to gaspers 8, on the side of the gaspers 8 distal from the cavity 29. A pair of two switches 6a, 6b are arranged next to each of the gaspers 8, respectively. A first switch 6a of each pair of switches 6a, 6b is configured for switching an adjacent reading light 4, which is arranged next to the switches 6a, 6b on the side opposite to the gaspers 8. The second switch 6b of each pair is a call button for triggering a signal for calling cabin service personnel.

A loudspeaker 11 (see FIG. 3A), which may be used for delivering acoustic announcements to the passengers, is arranged next to the reading lights 4. The side of the loudspeaker 11 facing the passengers is covered by covering 12.

Next to the loudspeaker 11, there is a display panel 14, including at least one visual sign (not shown), such as a "non smoking" sign and/or "fasten seat belt" sign. The display panel 14 comprises at least one light source 13 for selectively illuminating the visual sign from behind, in order to deliver visual information to the passengers sitting below the PSU 2.

An electric (printed) circuit board (PCB) 5 is arranged between the reading lights 4 and the gaspers 8. The electric circuit board 5 is electrically connected to the electrical components of the PSU 2, i.e. the loudspeaker 11, the reading lights 4, the switches 6, and a light source 13 of the display panel 14, by means of a plurality of electric wires 3.

The PSU 2 depicted in FIGS. 3A and 3B is configured for being installed above a seating row 80, comprising three passenger seats 82. Alternative embodiments of PSUs 2, which are not explicitly depicted in the figures, may comprise more or less reading lights 4, switches 6a, 6b, and/or gaspers 8, in order to be arranged above seating rows 80 comprising more or fewer passenger seats 82.

FIG. 4A depicts a perspective view of a gasper 8, which is an illuminated gasper 8 according to an exemplary embodiment of the invention. In FIG. 4A and the following figures, the gasper 8 is shown without the PSU 2.

The gasper 8 comprises a housing 36 including an upper portion 36a and a lower portion 36b. The upper portion 36a is fixed to the lower portion 36b by means of a snap-on mechanism, comprising elastic latches 34a, formed at the upper portion 36a, which are configured for engaging with corresponding protrusions 34b, formed at the lower portion 36b of the housing 36. In another configuration, which is not explicitly shown in the figures, the latches 34a may be formed at the lower portion 36b, and the protrusions 34b may be formed at the upper portion 36a. Other types of fixing mechanisms may be employed as well. The upper portion 36a, for example, may be glued to the lower portion 36b.

Figure 4B:
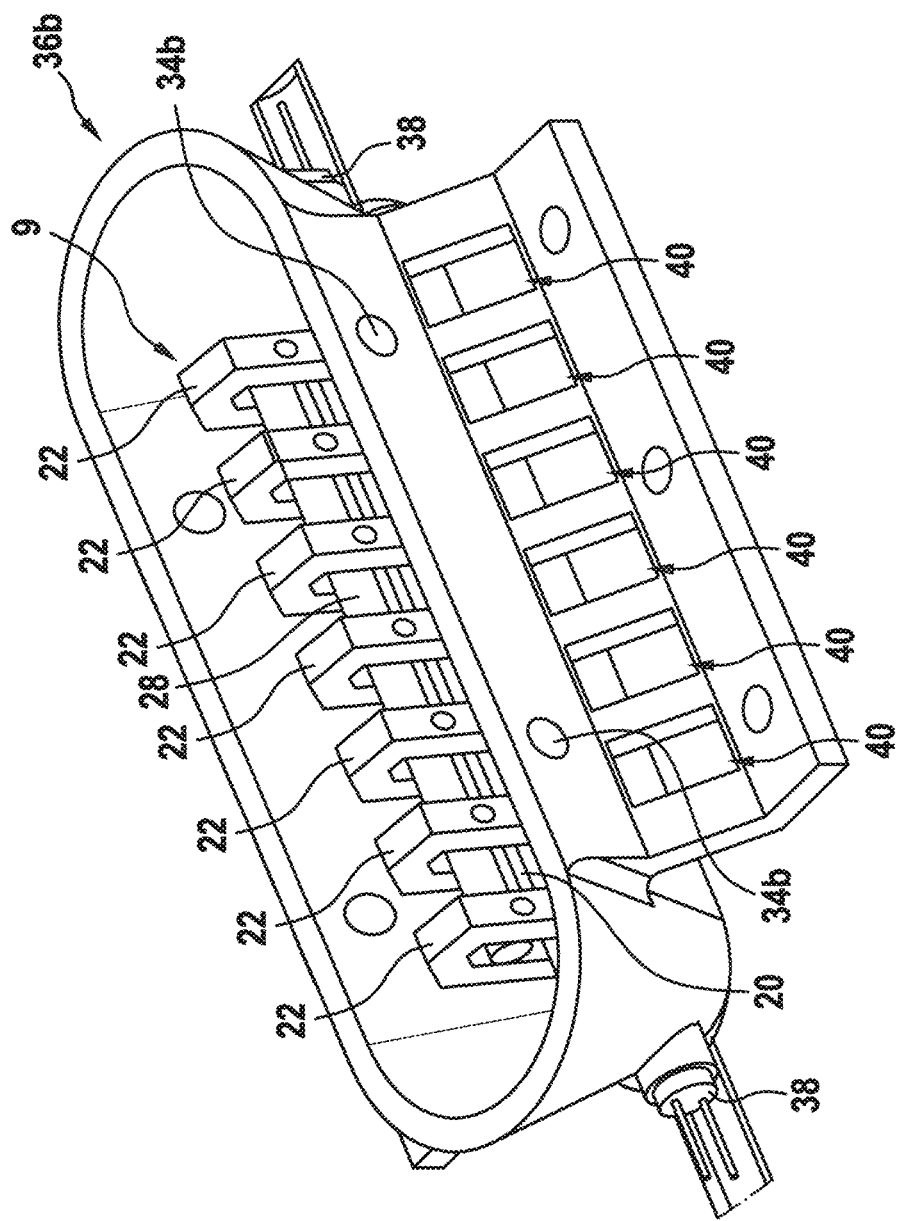
FIG. 4B depicts a perspective view of the gasper shown in FIG. 4A, with the upper portion of the housing being removed.

In FIG. 4B, the lower portion 36b of the housing 36 is shown without the upper portion 36a, in order to allow an insight into the trough-shaped lower portion 36b of the housing 36. The upper portion 36a of the housing 36 is shown again in FIG. 4C.

Further details of the gasper 8 will be described below with respect to FIGS. 5 to 7. Various features are also visible in FIGS. 4A and 4B, as will be apparent from a comparison of FIGS. 4A and 4B on the one hand and FIGS. 5 to 7 on the other hand.

Figure 4C:
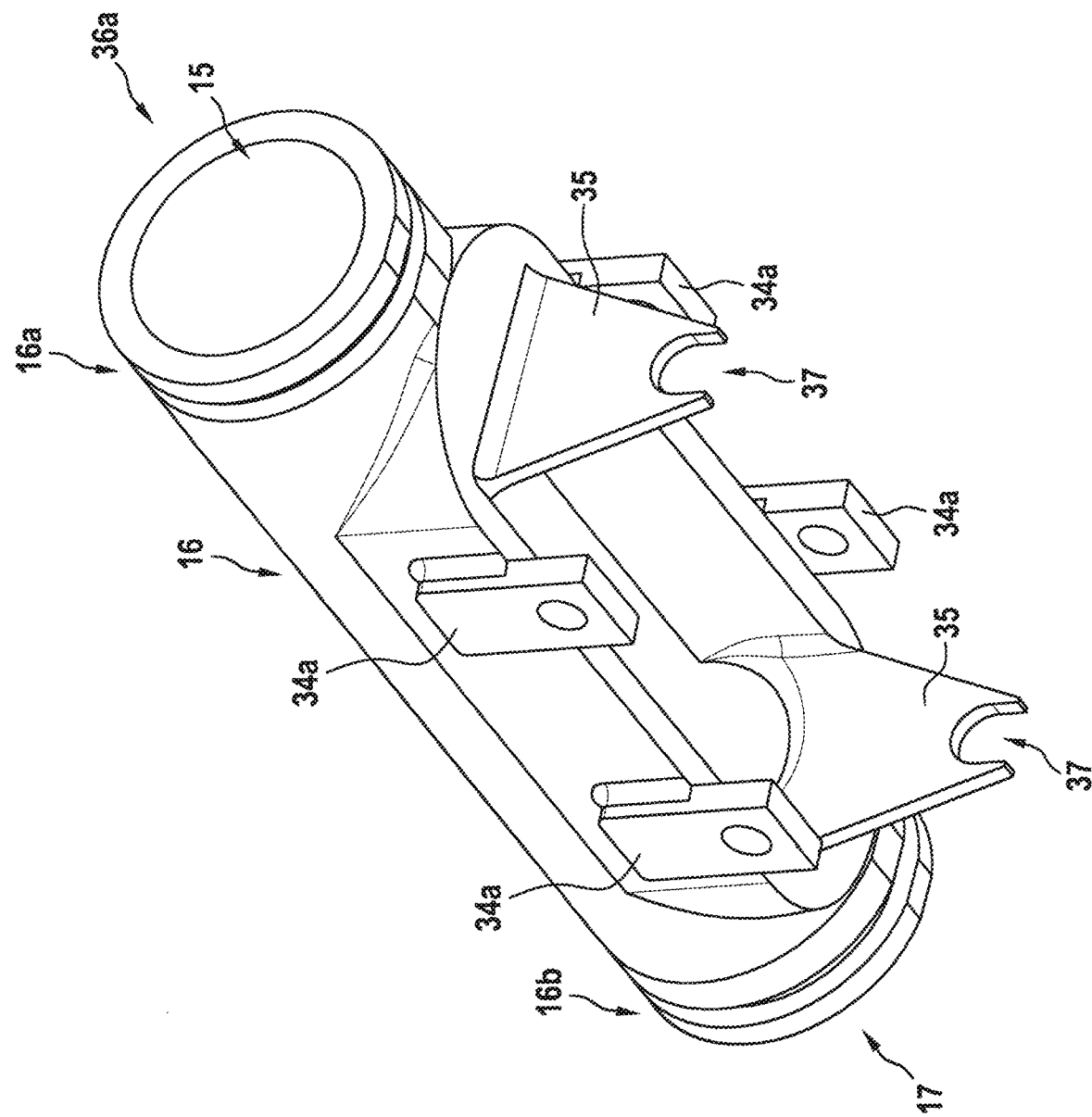
FIG. 4C depicts a perspective view of the upper portion of the housing of the gasper shown in FIG. 4A.
Figure 5B:
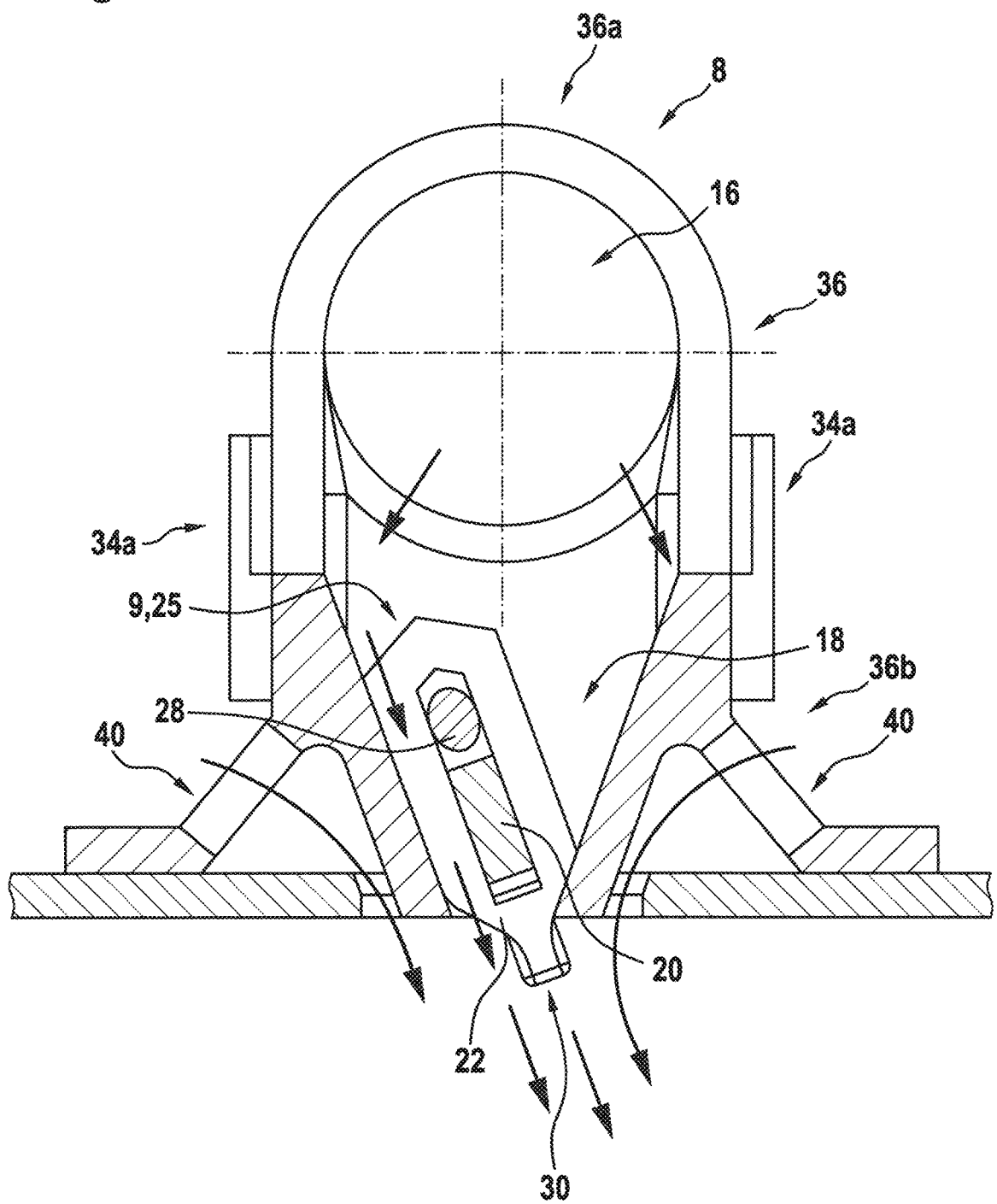
FIG. 5B depicts a cross-sectional view of said gasper, with the cross-sectional plane being orthogonal to the cross-sectional plane of FIG. 5A.

FIG. 5A depicts a longitudinal cross-sectional view through the gasper 8, depicted in FIGS. 4A to 4C; and FIG. 5B depicts a further cross-sectional view of said gasper 8, with the cross-sectional plane of FIG. 5B being indicated by dashed line C-C in FIG. 5A.

An air channel 16, extending along a longitudinal axis A, is formed within the upper portion 36a of the housing 36. In the embodiment depicted in the figures, the air channel 16 is cylindrical around the longitudinal axis A. The cylindrical shape of the air channel 16, however, is only exemplary, and the air channel 16 may have other shapes as well. The air channel 16 may for example have an elliptical or a polygonal cross-section, in particular a rectangular, hexagonal or octagonal cross-section.

The air channel 16 has an air inlet 15 at a first end 16a, shown on the right side of FIGS. 4A, 4C, and 5A, which is in fluid communication with an air source 19 (see FIG. 5A). The air source 19 is configured for delivering air into the air channel 16. The air source 19 may include a fan 45, arranged next to the gasper 8, which is configured for sucking air from the environment and deliver said air into the air inlet 15 of the gasper 8. The air source 19 also may include an air duct of an aircraft air conditioning system, supplying air to the gasper 8. A second end 16b of the air channel 16, which is arranged opposite to the first end 16a, is sealed in an air-tight manner, e.g. by a plug 17.

An air outlet 18 is formed within the lower portion 36b of the housing 36 (see FIG. 5A). When the gasper 8 is installed within a PSU 2 above the passenger seats 82 in an aircraft passenger cabin 102, as it is depicted in FIG. 2, the air outlet 18 is oriented downwards towards the passenger seats 82. As a result, air delivered into the air channel 16 via the air inlet 15 exits the air channel 16 via the air outlet 18 in a direction towards a passenger seat 82 arranged below the gasper 8.

In order to facilitate adjusting the direction of the flow of air, flowing out of the gasper 8 via the air outlet 18, an air guide 9 is arranged within the air outlet 18. The air guide 9 includes a longitudinal air guide element 20 extending in a longitudinal direction parallel to the longitudinal axis A, and a plurality of transverse air guide elements 22 mounted to the longitudinal air guide element 20. The transverse air guide elements 22 are mounted to the longitudinal air guide element 20 in a configuration allowing the transverse air guide elements 22 to pivot with respect to the longitudinal air guide element 20.

Figure 6:
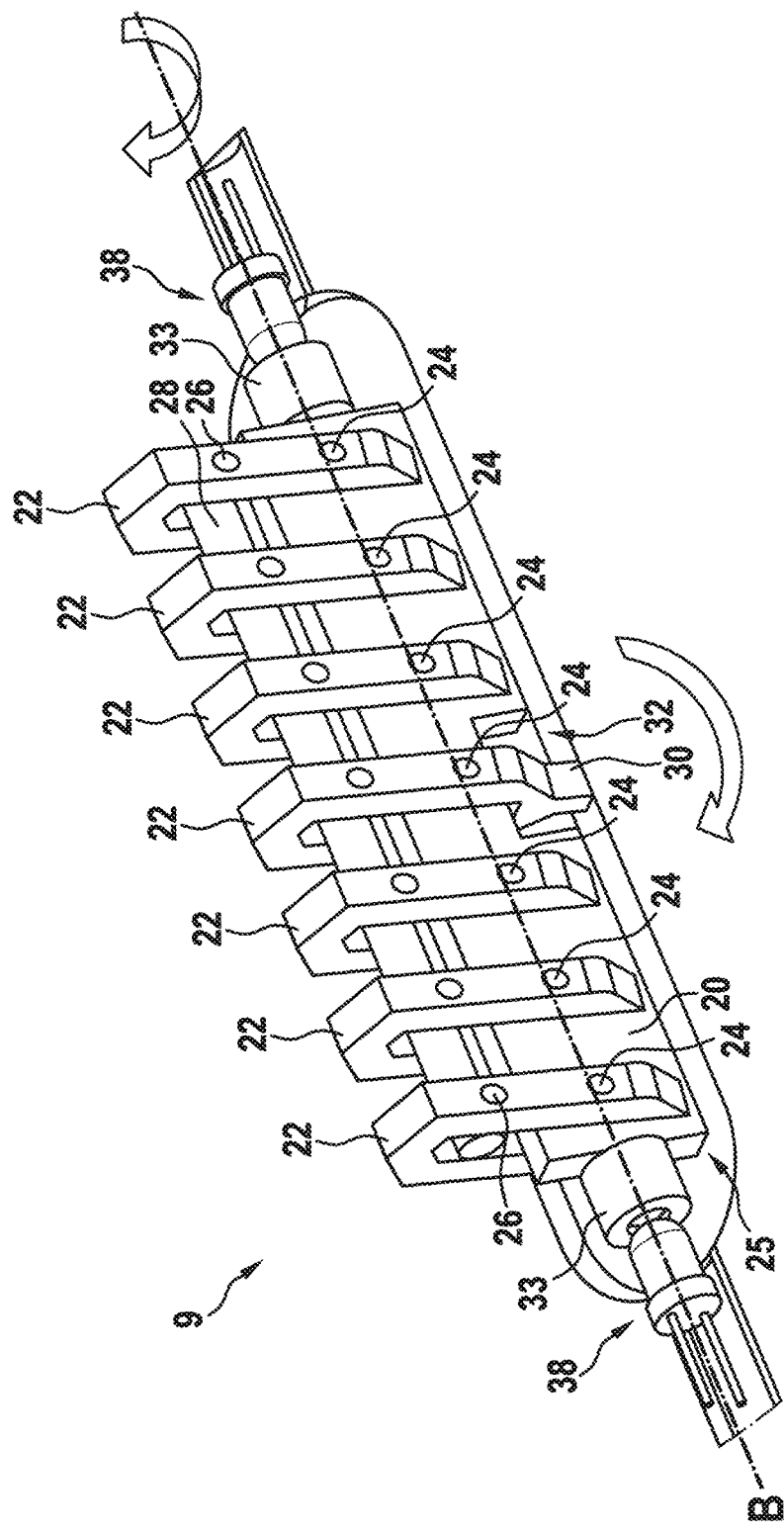
FIG. 6 depicts a perspective view of an air guide, including a single longitudinal air guide element and a plurality of transverse air guide elements, the air guide being usable in a gasper according to an exemplary embodiment of the invention.

FIG. 6 depicts a perspective view of the air guide 9 with a plurality of, in particular seven, transverse air guide elements 22 mounted to the longitudinal air guide element 20. FIG. 7 depicts a perspective view of a longitudinal air guide element 20 without the transverse air guide elements 22.

Each transverse air guide element 22 is mounted to the longitudinal air guide element 20 via a first axle 24, allowing the transverse air guide element 22 to pivot with respect to the longitudinal air guide element 20. The first axles 24 form transverse axes, which are oriented transversely, in particular orthogonally, to the longitudinal direction.

Each transverse air guide element 22 further comprises a second axle 26, extending parallel to the respective first axle 24, in a region above the longitudinal air guide element 20, i.e. on the side of the longitudinal air guide element 20 facing away from the passenger seats 82, when the gasper 8 is installed within the passenger cabin 102.

The second axles 26 are all linked to a common link 28, extending along the longitudinal air guide element 20.

The common link 28 is movable, in particular shiftable, in the longitudinal direction by pivoting the transverse air guide elements 22 around their first axles 24, respectively. The common link 28 couples the transverse air guide elements 22 mechanically with each other, causing them to pivot simultaneously around their respective first axles 24. In other words, all transverse air guide elements 22 are pivoted simultaneously around their respective first axles 24, when one of the transverse air guide elements 22 is manually pivoted.

One of the transverse air guide elements 22, in particular the transverse air guide element 22 arranged in the center of the plurality of transverse air guide elements 22, is provided with a protrusion 30, which may be grabbed easily by a passenger for manually pivoting the transverse air guide elements 22.

A recess 32 is formed in a central portion of the longitudinal air guide element 20, in order to allow moving the protrusion 30 in the longitudinal direction without interfering with the longitudinal air guide element 20.

Two cylindrical extensions 33 are formed at opposing end surfaces 20a, 20b of the longitudinal air guide element 20. The extensions 33 are both arranged on an axis B, extending in the longitudinal direction of the longitudinal air guide element 20. When the longitudinal air guide element 20 is arranged within the air outlet 18 of the gasper 8, the axis B is oriented parallel to the longitudinal axis A of the gasper 8 (cf. FIG. 5A).

The cylindrical extensions 33 are rotatably supported by support portions 39 of the lower portion 36b of the housing 36 of the gasper 8. The cylindrical extensions 33 are further held in position by fixtures 35, extending from the upper portion 36a of the housing 36. Each of the fixtures 35 comprises a circular cut out 37 (see FIG. 4C) for accommodating one of the cylindrical extensions 33 in a configuration that allows the longitudinal air guide element 20 to pivot around the axis B (see FIG. 5A).

As a result, the direction of the flow of air leaving the gasper 8 through the air outlet 18 is adjustable in two dimensions, namely (a) by pivoting the at least one longitudinal air guide element 20 around the axis B and (b) by pivoting the transverse air guide elements 22 around the respective first axles 24 extending transversely to the axis B, as it has been discussed before.

In a further configuration, which is not explicitly shown in the figures, the gasper 8 may comprise a plurality of air guides 9 arranged parallel to each other within the air outlet 18 of the gasper 8. In that case, the longitudinal and transverse air guide elements 20, 22 may form a two-dimensional grid of air guide elements 20, 22.

Two light sources 38, in particular LEDs, are arranged next to the extensions 33 of the longitudinal air guide element 20 for coupling light into the longitudinal air guide element 20 via the extensions 33. The light sources 38 may in particular be arranged on the axis B and oriented coaxially with the cylindrical extensions 33. The longitudinal air guide element 20, including the extensions 33, is at least partially transparent or translucent, in order to allow the light emitted by the light sources 38 to propagate therethrough. Optionally, the transverse air guide elements 22 may be at least partially transparent or translucent as well.

As schematically illustrated in FIG. 5A, the light coupled from the light sources 38 into the extensions 33 may be reflected one or more times at the outer boundaries (surfaces) of the longitudinal air guide element 20. Eventually, light is coupled out of the longitudinal air guide element 20 into the aircraft passenger cabin 102 via a light output surface 21, formed at the lower side of the longitudinal air guide element 20 and facing the passenger seats 82, which are not shown in FIG. 5A.

Thus, the longitudinal air guide element 20 acts as a light guide 25 for the light emitted by the light sources 38. When the light sources 38 are operated, light propagates inside the longitudinal air guide element 20 and is coupled out via the light output surface 21. The longitudinal air guide element 20 appears as an extended illuminated/glowing structure. Passengers will not have any difficulties in finding and identifying the gaspers 8 for adjusting the flow of air, flowing out of the gaspers 8, even in a dark environment. Additionally or alternatively, the light emitted via the longitudinal air guide elements 20 of the gaspers 8 may be used as a signal, e.g. for indicating that a service call button 6b was pressed by a passenger.

The light may be coupled out of the longitudinal air guide element 20 by any suitable out-coupling mechanism. For example, surface irregularities may be provided at one or more of the outer surfaces of the longitudinal air guide element 20. Instead of the specular reflection, which takes place during "normal" light propagation within the longitudinal air guide element 20, the surface irregularities may reflect at least some of the incident light diffusely. The diffuse reflections may then hit the light output surface 21 below the critical angle and may be coupled out of the longitudinal air guide element 20 at the light output surface 21. Such a mechanism is indicated in FIG. 5A via exemplary light rays that originate at the upper surface of the longitudinal air guide element 20, i.e. at the surface opposite to the light output surface 21, travel through the longitudinal air guide element 20, and leave the longitudinal air guide element 20 at the light output surface 21. These exemplary light rays may be due to surface irregularities at said upper surface of the longitudinal air guide element 20. It is pointed out that other mechanisms for coupling light out of the light guide may be employed as well.

When operated, the two light sources 38, associated with each of the longitudinal air guide elements 20, may emit light of the same color. Alternatively, each of the light sources 38, associated with a longitudinal air guide element 20, may be configured to emit light having a color which differs from the color of the light emitted by the other light source(s) 38 associated with the same longitudinal air guide element 20.

In yet another embodiment, at least one of the light sources 38 may be a multi-color light source 38, e.g. a multi-color LED, which is selectively controllable to emit light having a color which is selected from at least two different colors. Such a configuration allows for changing the color of the light, emitted via the longitudinal air guide elements 20, by appropriately controlling the operation of the light sources 38.

The light sources 38 of different gaspers 8, arranged within a single PSU 2, may be configured for emitting light having the same color. Alternatively, the light sources 38 of different gaspers 8 may be configured for emitting light having different colors. Illuminating different gaspers 8 of the same PSU 2 with light having different colors may facilitate identifying the assignment of each gasper 8 to its corresponding passenger seat 82.

A gasper 8 according to an exemplary embodiment of the invention may further comprise one or more supplementary air channels ("satellite air channels") 40 provided next to the air outlet 18 (see FIGS. 4A, 4B, and 5B). The satellite air channels 40 are designed so that the flow of air, flowing out of the gasper 8 through the air outlet 18, causes additional air to be sucked through the at least one satellite air channel 40 due to the Venturi effect. The additional air is output together with, in particular basically parallel with, the flow of air flowing through the air outlet 18, thereby enhancing the flow of air directed toward the passenger. Providing a gasper 8 with one or more satellite air channels 40, however, is an optional feature, and exemplary embodiments of the present invention include embodiments which do not comprise any satellite air channels 40.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An illuminated aircraft passenger cabin gasper, comprising:
    an air outlet for outputting a flow of air into an aircraft passenger cabin;
    at least one air guide, which is movably arranged within the air outlet for adjusting the flow of air, wherein each air guide comprises:

at least one longitudinal air guide element extending in a longitudinal direction and a plurality of transverse air guide elements mounted to the at least one longitudinal air guide element; and wherein each of the plurality of transverse air guide elements is mounted to the at least one longitudinal air guide element via an axle, which extends through the at least one longitudinal air guide element, and which allows the respective transverse air guide element to pivot with respect to the at least one longitudinal air guide element;

wherein the illuminated aircraft passenger cabin gasper further comprises:

at least one light source, arranged adjacent to the at least one longitudinal air guide element for coupling light into the longitudinal air guide element;

wherein the at least one longitudinal air guide element has a light output surface for coupling light out of the at least one longitudinal air guide element into the aircraft passenger cabin, so that the at least one longitudinal air guide element acts as a light guide for the light emitted by the at least one light source.

2. The illuminated aircraft passenger cabin gasper according to claim 1, comprising at least two light sources arranged on opposite sides of the at least one light guide for coupling light into the at least one light guide.

3. The illuminated aircraft passenger cabin gasper according to claim 2, wherein the at least two light sources, in operation, emit light of the same color or light having different colors.

4. The illuminated aircraft passenger cabin gasper according to claim 1, wherein the at least one light source is capable of selectively emitting light of different colors.

5. The illuminated aircraft passenger cabin gasper according to claim 1, wherein the at least one air guide is pivotable around a longitudinal axis (A), wherein the at least one light source is in particular arranged basically on said longitudinal axis (A).

6. The illuminated aircraft passenger cabin gasper according to claim 1, wherein each transverse air guide element is pivotable around a corresponding transverse axis which is oriented orthogonally to the longitudinal direction.

7. The illuminated aircraft passenger cabin gasper according to claim 1, wherein the plurality of transverse air guide elements are pivotably connected to a common link, extending in the longitudinal direction; wherein the common link is shiftable, in the longitudinal direction, by pivoting at least one of the plurality of transverse air guide elements.

8. The illuminated aircraft passenger cabin gasper according to claim 1, comprising a plurality of air guides arranged parallel to each other forming an air outlet grid.

9. The illuminated aircraft passenger cabin gasper according to claim 1, comprising a housing with at least one support portion, supporting the at least one air guide, in particular pivotably supporting the at least one air guide, wherein the housing comprises an air inlet for receiving the air to be output via the air outlet, wherein the illuminated aircraft passenger cabin gasper in particular comprises an air source, such as a fan or an air duct, in fluid communication with the air inlet for supplying air into the air inlet.

10. The illuminated aircraft passenger cabin gasper according to claim 9, wherein the housing comprises an upper portion and a lower portion, wherein the air outlet with the at least one air guide are in particular located in the lower portion and the air inlet is in particular provided in the upper portion.

11. The illuminated aircraft passenger cabin gasper according to claim 1, further comprising at least one satellite air channel formed next to the air outlet, so that air flowing through the air outlet causes additional air to be sucked through the at least one satellite air channel and to be output together with, in particular basically parallel with, the flow of air flowing through the air outlet.

12. An aircraft passenger cabin service unit, comprising:
at least one illuminated aircraft passenger cabin gasper according to claim 1; and
at least one component of the group including a reading light, an oxygen mask, a loudspeaker, a display panel, and an electrical switch or any combination including at least two of these components.

13. The aircraft passenger cabin service unit according to claim 12,
wherein the at least one illuminated aircraft passenger cabin gasper includes a first illuminated aircraft passenger cabin gasper and a second first illuminated aircraft passenger cabin gasper, wherein the light sources of the first and second aircraft passenger cabin gaspers are configured for emitting light having different colors.

14. An aircraft comprising:
an aircraft passenger cabin; and
a plurality of aircraft passenger cabin service units according to claim 12, located within the aircraft passenger cabin.

* * * * *